United States Patent [19]

Zaiser et al.

[11] Patent Number: 5,445,041
[45] Date of Patent: Aug. 29, 1995

[54] GEARWHEEL CHANGE TRANSMISSION OF THE COUNTERSHAFT TYPE

[75] Inventors: Wolfgang Zaiser, Steinheim; Helmut Bender, Pleidelsheim, both of Germany

[73] Assignee: Mercedes-Benz AG, Germany

[21] Appl. No.: 257,323

[22] Filed: Jun. 7, 1994

[30] Foreign Application Priority Data

Jun. 7, 1993 [DE] Germany .................. 43 18 713.7

[51] Int. Cl.⁶ ............................................. F16H 3/08
[52] U.S. Cl. ................................... 74/331; 74/325; 74/330; 74/333
[58] Field of Search ................. 74/325, 330, 331, 333

[56] References Cited

U.S. PATENT DOCUMENTS

| | | | |
|---|---|---|---|
| 4,677,874 | 7/1987 | Friedrick | 74/331 X |
| 5,031,473 | 7/1991 | Yumoto et al. | 74/331 X |
| 5,184,522 | 2/1993 | Nordkvist | 74/331 X |
| 5,186,065 | 2/1993 | Downs . | |
| 5,311,789 | 5/1994 | Henzler et al. | 74/359 X |

FOREIGN PATENT DOCUMENTS

| | | |
|---|---|---|
| 0206563 | 6/1986 | European Pat. Off. . |
| 0239553 | 2/1987 | European Pat. Off. . |
| 4206033A1 | 3/1993 | Germany . |

*Primary Examiner*—Charles A. Marmor
*Assistant Examiner*—Peter Kwon
*Attorney, Agent, or Firm*—Evenson, McKeown, Edwards & Lenahan

[57] ABSTRACT

In a gearwheel change transmission, an input shaft, an output shaft and a countershaft are connected to one another by three bound gearwheel stages.

2 Claims, 1 Drawing Sheet

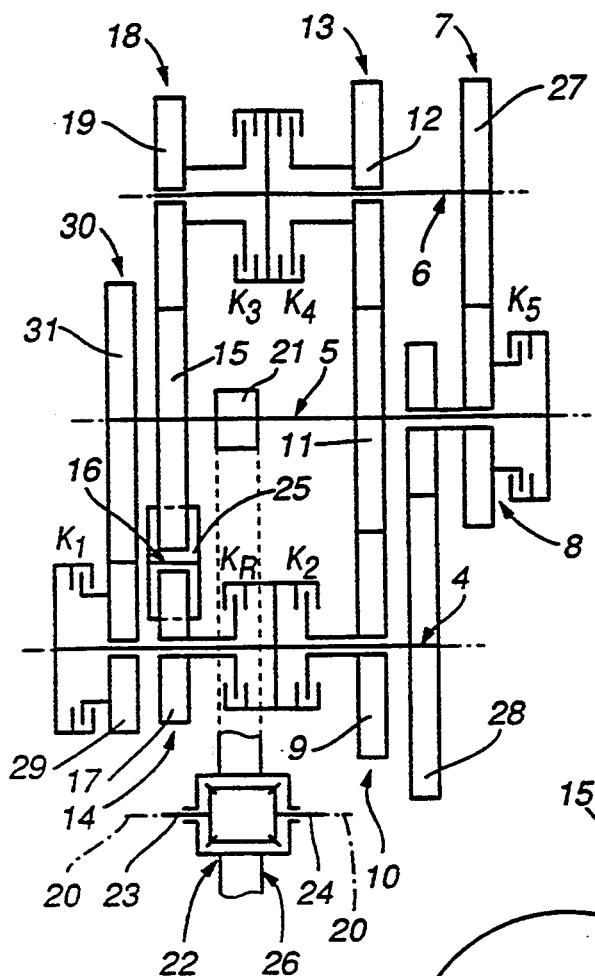
Fig. 1
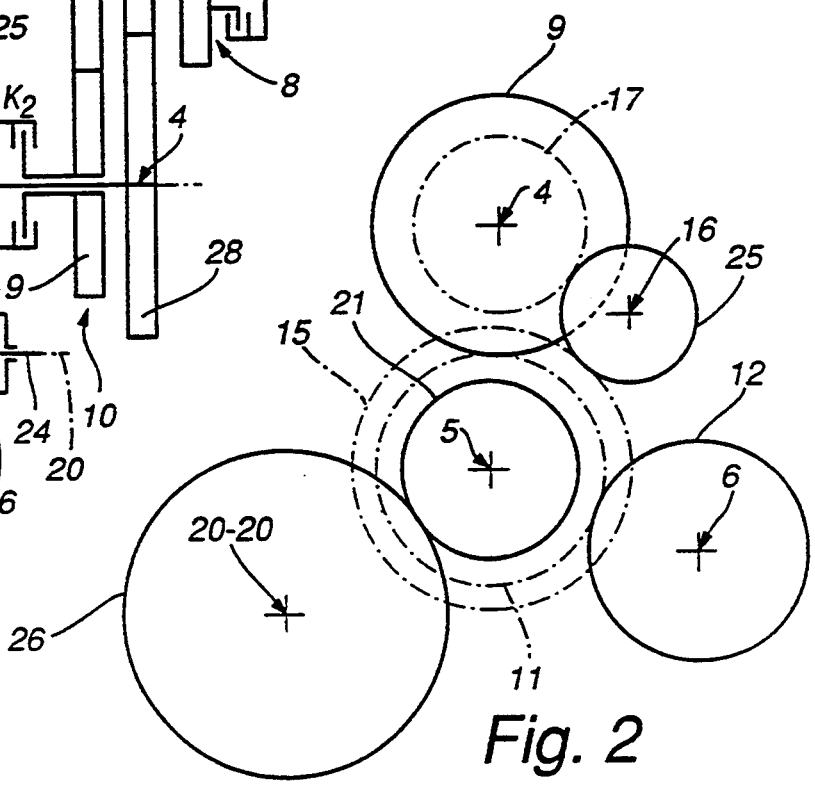
Fig. 2
Fig. 3
| Gg | $K_1$ | $K_2$ | $K_3$ | $K_4$ | $K_5$ | $K_R$ |
|---|---|---|---|---|---|---|
| 1 | ● | | | | | |
| 2 | | ● | | | | |
| 3 | | | ● | | | |
| 4 | | | | ● | | |
| 5 | | | | | ● | |
| R | | | | | | ● |

GEARWHEEL CHANGE TRANSMISSION OF THE COUNTERSHAFT TYPE

BACKGROUND AND SUMMARY OF THE INVENTION

The present invention relates to a gearwheel change transmission for motor vehicles comprising an input shaft, a countershaft and an output shaft selectively connectable into constant drive connection with drivable vehicle wheels of the motor vehicle. In this type of transmission, the countershaft and the output shaft are arranged parallel to the input shaft which is drivable from an engine of the motor vehicle. The countershaft is in constant drive connection with the input shaft via a bound gearwheel stage and has a middle loose gearwheel on the output shaft. A loose wheel of a gearwheel stage of one forward gear has a fixed wheel arranged on the output shaft and can be coupled to the countershaft via a non-positive first shift coupling. A loose wheel of a gearwheel stage of a further forward gear has a fixed wheel assigned to the output shaft and is couplable to the input shaft via a non-positive second shift coupling. A three-membered reverse gear gearwheel stage has a fixed wheel assigned to the output shaft, and a middle gearwheel for reversing direction of rotation of the output shaft is operatively arranged rotatably as a reversing wheel on an intermediate shaft and is configured to be insertable into a force flux between the input shaft and output shafts via an additional shift coupling as a drive connection.

In a known gearwheel change transmission of the type shown in EP 0,512,214 A2, the loose wheels of the gearwheel stages for one forward gear and the reverse gear are arranged fixedly on an additional intermediate shaft which is arranged as a hollow shaft concentrically on the input shaft and which can be coupled to the latter by the shift coupling of the one forward gear which consequently also has to be engaged in reverse gear. The fixed wheels of the gearwheel stages associated with the forward gear and reverse gear can be coupled by a change shift coupling to the output shaft which is of long construction as a result, on one hand, of the change shift coupling and, on the other hand, also because the output shaft also has a fixed wheel of the gearwheel stage of the further forward gear, the loose wheel being mounted on the countershaft.

DE 3,116,383 A1 discloses a gearwheel change transmission of another type in which, instead of a countershaft, there is provided a second output shaft which, like the first output shaft, meshes, via an output gearwheel relatively rotationally fixed, with an outer annual gearwheel of an axle differential. Because a countershaft is not used, the two output shafts are each connected directly to the input shaft via three gearwheel stages, the fixed wheels of which are all seated on the input shaft. In one embodiment of this known gearwheel change transmission, two gearwheel stages for driving one output shaft each in a forward gear are each combined with a gearwheel stage for driving the other output shaft in two further forward gears via associated fixed wheels of the input shaft, to form a bound gearwheel stage in each case. For a further forward gear, the remaining third non-bound gearwheel stage is used for driving the one output shaft, and the reverse gear is formed by the third non-bound gearwheel stage for driving the other output shaft. For this purpose, the sliding shift sleeve connected rotationally fixed to the other output shaft and belonging to the change shift coupling used for the optional coupling of the loose wheels of the two bound gearwheel stages to this other output shaft is provided with an outer toothed rim which can be brought into engagement with the middle gearwheel which is mounted as a reversing wheel on an additional intermediate shaft and which meshes with that fixed wheel of the input shaft belonging to the third non-bound gearwheel stage of the other output shaft.

U.S. Pat. No. 5,184,522 discloses a different known gearwheel change transmission in which, although both a countershaft and an output shaft., capable of being brought into constant drive connection with drivable vehicle wheels, are each arranged parallel to an input shaft drivable from an engine, the reversing wheel, arranged on an additional intermediate shaft, of the gearwheel stage for forming the reverse gear is used as a loose wheel for the bound gearwheel stage for the constant drive of the countershaft by means of the input shaft. Finally, this known gearwheel change transmission also differs from the known generic concept in that the fixed wheel of the gearwheel stage of the reverse gear is not assigned to the output shaft, but is mounted on the input shaft, and in that the shift couplings are not non-positive. Although a loose wheel arranged on the input shaft and a loose wheel arranged on the countershaft are combined via a fixed wheel of the output shaft to form a bound gearwheel stage for shifting two forward gears, such a binding is not possible for the three-membered gearwheel stage of the reverse gear, because, in this, the fixed wheel and the reversing wheel are already integrated into the bound gearwheel stage for the constant drive of the countershaft.

Thus, conventional concepts have pointed in three mutually exclusive directions for the basic design of a gearwheel change transmission provided for transverse mounting in a vehicle. The first direction leads, by way of the known gearwheel change transmission as characterized above, on one hand, to a bound gearwheel stage for the constant drive of the countershaft by the input shaft, with the arrangement of the loose wheel on the output shaft and, on the other hand, to the use of a double gearwheel as loose wheels for a non-bound gearwheel stage of a forward gear and the three-membered gearwheel stage of the reverse gear with a non-positive shift coupling for coupling the double gearwheel to the input shaft. This first direction necessitates additional coupling apparatus (change shift coupling) for fixing the respective fixed wheel of these two gearwheel stages in relation to the output shaft.

The second direction, according to the respective gearwheel change transmission of a different generic type, provides the use of a second output shaft, instead of a countershaft, and a completely different formation of the reverse gear by the use of a toothed rim of a sliding shift sleeve of a change shift coupling, and, although four forward gears are formed by two gearwheel stages bound via fixed wheels of the input shaft nevertheless a binding of this type is not possible for the reverse gear on account of the incorporation of a sliding shift sleeve into the respective gearwheel stage.

Finally, the third direction shown by the other gearwheel change transmission of a different generic type leads along yet another route, namely to an additional use of the three-membered gearwheel stage of the reverse gear, with the incorporation both of a fixed wheel and of a reversing wheel into the bound gearwheel stage for the constant drive of the countershaft via the input shaft.

An object on which the present invention is based is essentially to provide a gearwheel change transmission of the countershaft type which is of short construction in the directions of the axes of rotation of the parallel transmission shafts.

The foregoing object has been achieved in an advantageous way in accordance with the present invention by providing that a reverse gear stage gearwheel is a loose wheel on the countershaft arranged independently of the further forward gear shift coupling which is connected to the input shaft and is couplable to the countershaft via an additional shift coupling. The fixed wheel of the reverse gear gearwheel stage is constantly rotationally fixedly connected to the output shaft, and a fixed wheel of a forward gear gearwheel stage, couplable via its loose wheel to the countershaft via the one forward gear first shift coupling meshes with a further forward gear stage loose wheel, which is couplable to the input shaft via the second shift coupling. The fixed wheel of the reverse gear gearwheel stage meshes with the loose wheel associated with a third forward gear gearwheel stage and is couplable to the input shaft via a non-positive fourth shift coupling.

In the gearwheel change transmission according to the present invention, there is no need for the constructional space which, in the known gearwheel change transmission of the relevant generic type, is required in the region of the output shaft for the change shift coupling and for the one fixed wheel. Likewise, in the gearwheel change transmission according to the present invention, there is no need for the shift outlay required for the change shift coupling in the known gearwheel change transmission of the relevant generic type.

In the gearwheel change transmission according to the present invention, only three gearwheels are arranged on the input shaft in comparison with the four gearwheels in the known gearwheel change transmission of the relevant generic type. Furthermore, the number of fixed wheels necessary on the output shaft is also reduced by one further fixed wheel in comparison with the known gearwheel change transmission, and the reverse gear can be shifted under load.

In the gearwheel change transmission according to the invention, the outlay in terms of construction is low on account of the bound gearwheel stages. The relative rotational speeds are low in the case of the shift coupling for reverse gear because of its position in the force flux between the input and output shafts.

BRIEF DESCRIPTION OF THE DRAWINGS

These and other objects, features and advantages of the present invention will become more readily apparent from the following detailed description thereof when taken in conjunction with the accompanying drawings wherein:

FIG. 1 is a schematic drawing of a gearwheel change transmission according to the present invention;

FIG. 2 is a schematic cross-sectional diagram through the gearwheel change transmission of FIG. 1 to illustrate the spatial arrangement of the transmission shafts; and FIG. 3 is a table indicating the shift coupling engaged in the respective gear in the gearwheel change transmission of FIG. 1.

DETAILED DESCRIPTION OF THE DRAWINGS

An input shaft 6 of a gearwheel change transmission can be driven in a known way by an engine via a hydrodynamic torque converter and can be coupled by two non-positive shift couplings $K_4$, $K_3$ to respective loose wheels 12, 19 of two gearwheel stages 13, 18. Fixed wheels 11, 15 of the respective stages 13, 18 are each seated on both sides of a pinion 21 fixedly in terms of motion on an output shaft 5 parallel to the input shaft 6. The pinion 21 is likewise rotationally fixed relative to the output shaft 5 and meshes with an annular gearwheel 26 which, instead of an otherwise conventional ring gear, drives an axle differential 22 which is connected on the output side in a known way to axis-drive halfshafts 23, 24 mounted coaxially relative to a geometrical major axis 20—20.

On the side of the fixed wheel 11 opposite to the pinion 21, there a loose wheel 8 in the form of a double gearwheel is arranged rotatably on the output shaft 5 and, as part of a bound gearwheel stage 7, meshes via its larger toothed rim with a fixed wheel 27 seated on the input shaft 6 and by way of its smaller toothed rim with a fixed wheel 28 seated on a countershaft 4 parallel to the input and output shafts 6, 5, so that the countershaft 4 is constantly driven by the input shaft 6 by way of the bound gearwheel stage 7. The loose wheel 8 can be coupled to the output shaft 5 by means of a non-positive shift coupling $K_5$.

Two non-positive shift couplings $K_2$, $K_R$ are provided in the axially middle region of the countershaft 4, so that the countershaft 4 can be coupled to a loose wheel 9 of a gearwheel stage 10 or to a loose wheel 17 of a three-membered gearwheel stage 10. The loose wheel 9 of the gearwheel stage 10 likewise meshes with the fixed wheel 11 of the gearwheel stage 13, so that the gearwheel stages 10 and 13 are bound.

A further loose wheel 29 of a gearwheel stage 30 is provided on the side of the loose wheel 17 opposite the shaft coupling $K_R$ and can be coupled to the countershaft 4 by a non-positive shift coupling $K_1$. The loose wheel 29 meshes with a fixed wheel 31 seated on the output shaft 5.

A middle gearwheel 25, which reverses the direction of rotation of the output shaft 5 in relation to the direction of rotation of the input shaft 6 is mounted rotatably on an intermediate shaft 16 parallel to the shafts 4 to 6 and meshes both with the fixed wheel 15 of the gearwheel stage 18 and with the loose wheel 17 of the gearwheel stage 14. The gearwheel stages 14 and 18 are consequently also bound.

The spatial position of the shafts 4 to 6 and 16 both in relation to one another and in relation to the geometrical major axis 20—20 of the axle differential 22 is self-evident from FIG. 2.

According to the shift table of FIG. 3, in first gear the shift coupling $K_1$ is engaged and the loose wheel 29 of the gearwheel stage 30 is thereby coupled to the countershaft 4. As a result, the force flux runs from the input shaft 6 by way of the bound gearwheel stage 7 to the countershaft 4 and from the latter by way of the gearwheel stage 30 to the output shaft 5.

In second gear the shift coupling $K_2$ is engaged and the loose wheel 9 of the gearwheel stage 10 is thereby coupled to the countershaft 4. As a result, the force flux runs from the input shaft 6 by way of the bound gearwheel stage to the countershaft 4 and from the latter by way of the gearwheel stage 10 to the output shaft 5.

In 3rd gear the shift coupling $K_3$ is engaged and the loose wheel 19 of the gearwheel stage 18 is thereby coupled to the input shaft 6. As a result, the force flux runs from the input shaft 6 by way of the gearwheel stage 18 directly to the output shaft 5.

In 4th gear the shift coupling $K_4$ is engaged and the loose wheel 12 of the gearwheel stage 13 is thereby coupled to the input shaft 6. As a result, the force flux runs from the input shaft 6 by way of the gearwheel stage 13 directly to the output shaft 5.

In 5th gear the shift coupling $K_5$ is engaged and the loose wheel 8 is thereby coupled to the output shaft 5. As a result, the force flux runs from the input shaft 6 by way of the gearwheel stage 7 directly to the output shaft 5.

In reverse gear, the shift coupling $K_R$ is engaged and the loose wheel 17 of the gearwheel stage 14 is thereby coupled to the countershaft 4. As a result, the force flux runs from the input shaft 6 by way of the gearwheel stage 7 to the countershaft 4 and from the latter by way of the gearwheel stage 14 to the output shaft 5. Because of the position of the shift coupling $K_R$ in the force flux at a point between the bound gearwheel stage 7 and the gearwheel stage 14, the relative rotational speeds of the shift coupling $K_R$ are relatively low.

Due to the position of the pinion 21 in an axially middle region of the output shaft 5, the constructional length of the gearwheel change transmission can be kept advantageously small.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A gearwheel change transmission for a motor vehicle, comprising an input shaft, a countershaft and an output shaft selectively connectable into constant drive connection with drivable vehicle wheels of the motor vehicle, the countershaft and the output shaft being arranged parallel to the input shaft which is drivable from an engine of the motor vehicle, the countershaft being in constant drive connection with the input shaft via a bound gearwheel stage and having a middle loose gearwheel on the output shaft, a loose wheel of a gearwheel stage of one forward gear, which has a fixed wheel arranged on the output shaft, is couplable to the countershaft via a non-positive first shift coupling, and a loose wheel of a gearwheel stage of a further forward gear, which has a fixed wheel of which is assigned to the output shaft, is couplable to the input shaft via a non-positive second shift coupling, and a three-membered reverse gear gearwheel stage, which has a fixed wheel operatively arranged with the output shaft and a middle gearwheel for reversing direction of rotation of the output shaft, is operatively arranged rotatably as a reversing wheel on an intermediate shaft and is configured to be insertable into a force flux between the input shaft and output shaft via an additional shift coupling as a drive connection, wherein a gearwheel of the reverse gear gearwheel stage constitutes a loose wheel on the countershaft, is arranged independently of the further forward gear shift coupling associated with the input shaft and is couplable to the countershaft via the additional shift coupling, the fixed wheel of the reverse gear gearwheel stage is constantly rotationally fixedly connected to the output shaft, a fixed wheel of the gearwheel stage, couplable via a loose wheel thereof to the countershaft via the one forward gear first shift coupling is configured to mesh with the further forward gear gearwheel stage loose wheel, which is couplable to the input shaft via the second shift coupling, and the fixed wheel of the reverse gear gearwheel stage is configured to mesh with a third forward gear gearwheel stage loose wheel and is couplable to the input shaft via a non-positive fourth shift coupling.

2. The gearwheel change transmission according to claim 1, wherein the shift coupling constituting a connection between the loose wheel of the reverse gear gearwheel stage and the countershaft is non-positive.

* * * * *